United States Patent
Liu

(10) Patent No.: US 7,809,073 B2
(45) Date of Patent: Oct. 5, 2010

(54) MULTIPLE INPUT/MULTIPLE OUTPUT COMMUNICATION METHOD BASED ON DISTRIBUTED TRANSMISSION SOURCES

(75) Inventor: Sheng Liu, Guangdong (CN)

(73) Assignee: Utstarcom Telecom Co., Ltd., Hangzhou (CN)

( * ) Notice: Subject to any disclaimer, the term of this patent is extended or adjusted under 35 U.S.C. 154(b) by 811 days.

(21) Appl. No.: 11/578,610

(22) PCT Filed: Apr. 14, 2004

(86) PCT No.: PCT/CN2004/000351

§ 371 (c)(1),
(2), (4) Date: May 16, 2007

(87) PCT Pub. No.: WO2005/101690

PCT Pub. Date: Oct. 27, 2005

(65) Prior Publication Data

US 2007/0280370 A1    Dec. 6, 2007

(51) Int. Cl.
*H04B 7/02* (2006.01)

(52) U.S. Cl. .................. 375/267; 375/130; 375/147; 375/150; 375/316; 375/343; 375/345; 375/260; 375/347

(58) Field of Classification Search ............ 375/267, 375/260, 130, 143, 343, 345, 347
See application file for complete search history.

(56) References Cited

U.S. PATENT DOCUMENTS

| 5,657,374 | A | 8/1997 | Russell et al. |
| 6,370,129 | B1 | 4/2002 | Huang |
| 7,167,507 | B2 * | 1/2007 | Mailaender et al. ......... 375/148 |
| 2005/0111566 | A1 * | 5/2005 | Park et al. .................... 375/267 |

FOREIGN PATENT DOCUMENTS

| CN | 1304218 | 7/2001 |
| CN | 1354610 | 6/2002 |
| WO | 01/84865 | 11/2001 |
| WO | 03/009492 | 1/2003 |

* cited by examiner

*Primary Examiner*—Shuwang Liu
*Assistant Examiner*—Dhaval Patel
(74) *Attorney, Agent, or Firm*—Ladas and Parry LLP

(57) ABSTRACT

A MIMO method based on distributed transmission sources for transmitting a downlink data stream between M transmitting antennas and a mobile terminal having P receiving antennas, M and P>1, channels from at least two transmitting antennas to one of receiving antennas have different multipath distributions, comprises transmitting a different sub-data stream of M sub-data streams from the M transmitting antennas respectively to the mobile terminal by using the same spreading code: estimating multipath channel matrix of channels from the M transmitting antennas to the receiving antenna, which use the spreading code: and processing transmitted signals corresponding to the M sub-data streams received by the receiving antenna based on the multipath channel matrix of each receiving antenna, to restore the downlink data stream.

10 Claims, 9 Drawing Sheets

MULTIPLE INPUT/MULTIPLE OUTPUT COMMUNICATION METHOD BASED ON DISTRIBUTED TRANSMISSION SOURCES

TECHNICAL FIELD

The present invention relates to the communication method for wireless signal of a base station in a mobile communication system, and especially relates to the communication method based on multiple input/multiple output (MIMO) technique in the centralized base station system based on remote radio frequency units.

BACKGROUND TECHNOLOGY

1. Centralized Base Station Having the Structure Based on Remote Radio Frequency Units In the mobile communication system, the transmission, reception and processing of the wireless signals are performed by base stations (BTS). As shown in FIG. 1, a conventional BTS 10 is mainly composed by a baseband processing subsystem 11, a radio frequency (RF) subsystem 12 and antennas 13, and one BTS may cover different cells (cell 14) through a plurality of RF antennas. FIG. 2 presents another kind of base station using distributed transmission sources, i.e., using the system architecture of a centralized base station based on radio frequency units. As compared to the conventional base station, such a centralized base station based on radio frequency units has many advantages: allowing to replace one macro cell based on the conventional base station with a plurality of micro cells, thereby best accommodating different wireless environments and increasing wireless performances such as capacity, coverage and etc. of the system; The centralized structure makes it possible to perform the soft handoff in the conventional base station by a softer handoff, thereby obtaining an additional process gain. The centralized structure also makes it possible to use costly baseband signal processing resources as a resource pool shared by a plurality of cells, thereby obtaining benefits of commonly sharing and reduced system cost. More details of this technique are disclosed in PCT patent WO9005432 "Communications system", U.S. Pat. No. 5,657,374 "Cellular system with centralized base stations and distributed antenna units", U.S. Pat. No. 6,324,391 "Cellular communication with centralized control and signal processing", China patent application CN1464666 "Soft base station system based on fiber optic stretch and synchronous method thereof", China patent application CN1471331 "Base station system for mobile communication" and United States Patent application US20030171118 "Cellular radio transmission apparatus and cellular radio transmission method".

As shown in FIG. 2, the centralized base station system 20 based on remote radio frequency units is composed of a centralizedly configured central channel processing subsystem 21 and remote radio frequency units 24 which are connected through the wideband transmission link or network. The central channel processing subsystem mainly comprises functional units such as the channel processing resource pool 22, the signal routing distribution unit 23 and etc., wherein the channel processing resource pool is formed by stacking a plurality of channel processing units, and performs tasks such as baseband signal processing, and the signal distribution unit dynamically allocates channel processing resources according to the traffic of different cells to realize effective sharing of the processing resources among multiple cells. Besides the implementation inside the centralized base station as shown in FIG. 2, the signal routing distribution unit may also be implemented as a separate device outside the centralized base station. The remote antenna element is mainly constituted by functional units such as the transmission channel's radio frequency power amplifier, the reception channel's low noise amplifier, antennas and etc. The link between the central channel processing subsystem and the remote antenna unit may adopt transmission medium such as optical fiber, coaxial cable, microwave and etc.; the signal transmission may be done by way of digital signals after sampling, or analog signals after modulating; the signals may be baseband signals, intermediate frequency signals or radio-frequency signals.

However, the micro cell structure of the centralized base station system based on remote radio frequency units may cause the problem of frequent handoff. To overcome the problem, the inventors propose an effective solution in a patent application entitled "micro cell management method in the mobile communication system using the centralized base station", wherein dynamic cell control is performed for the cells under coverage by the base station according to the parameters such as the UE's moving speed, cell load conditions, processing resource occupation of the centralized base station. Such a dynamic cell control is to dynamically group a plurality of geographically adjacent cells with the similar parameters into one cell. For this dynamically generated cell, the downlink scramble code is the same, and the radio remote frequency units corresponding to the original micro cells forming the dynamic generated cell constitute a distributed radio frequency transceiver system of the dynamically generated cell. In addition, according to the patent application, it is also possible to employ a fixed configuration method to merge neighbouring micro cells into one cell, i.e., to fixedly configure the geographically adjacent micro cells in some areas into one cell according to a predetermined system configuration. This is mainly suitable for the case where system design capacity is small at time of initial network construction. For the convenience of explanation, such a cell formed by dynamically or fixedly merging the geographically adjacent micro cells is called a complex cell.

Although the above improvement has been proposed, the inventors keep on seeking new improvements. The inventors recognize that when several micro cells are merged into a complex cell, since the code resources (that is, channel resource) do not increase and the cell's size increases, the channel capacity is relatively insufficient as compared to the original micro cells.

The inventor further find that since a complex cell is formed by more than one micro cells, there is certainly more than one antennas, and thus it is possible to employ multiple antenna transmitting/receiving (MIMO) technique in the complex cell to increase communication capacity, thereby remitting or overcoming the adverse effect.

2. Multiple Antenna Transmitting/Receiving (MIMO) Technique

The multiple antenna transmitting/receiving (MIMO) technique is a new technique recently developed for effectively increase spectral efficiency. In the present standardization work of 3GPP (third generation cooperation project) on UMTS (universal mobile communication system), researching is also performed with respect to this technique. For MIMO technique and its application in UMTS, please refer to literatures such as "From theory to practice: an overview of MIMO space-time coded wireless systems, IEEE Journal on Selected Areas in Communications, vol. 21, no. 3, April 2003", 3GPP work document "R2-010504, Overview of Multiple-Input Multiple-Output Techniques for HSDPA" and etc. There are mainly two kinds of MIMO techniques at present, one is based on multiple antenna transmission diversity and reception diversity for maximizing the diversity gain, another is based on channel code reusing scheme for maximizing the data rate, wherein the MIMO based on channel code reusing scheme is most representative.

FIG. 3 shows a structure 30 of a MIMO system transmitting terminal based on channel code reusing scheme in a multi-code system such as HSDPA (high speed downlink packet access) and etc. The high speed data stream after channel encoding branches into M·N substreams through a branching unit 31, wherein M is the number of antennas of transmitting terminals, and N is the number of parallel downlink code channels in the multi-code system such as HSDPA and etc. Each data stream group constituted by M substreams is spread through a corresponding downlink channel code respectively in a spreading unit 32. M signals are then synthesized, appended with dedicated pilot sequences orthogonal to each other and transmitted through M antennas respectively. It can be seen that since each group of M substreams reuses one downlink channel code, the data rate is increased by a factor of M.

In the prior art, the antennas of a transmitting terminal and a receiving terminal in the MIMO system are centralizedly located. As shown in FIG. 4, to reduce the correlation between antennas as far as possible, it is usually needed to guarantee that the spacing between antennas is at least above a half wavelength. Although the antennas of the transmitting and receiving terminals are apart from a certain given distance, since the distance between the base station and the mobile terminal is relatively large, the existing MIMO system is suitable for the ideal communication channels meeting the following conditions in the downlink direction:

(1) the multipath numbers and multipath delays from different transmitting antennas to any receiving antenna are equal;

(2) the average path losses from different transmitting antennas to any receiving antenna are equal;

(3) the multipath channel fading of propagation paths from different transmitting antennas to any receiving antenna are mutually independent;

(4) the interferences and the noise power spectra received by different receiving antennas are equal and independent from each other.

Under the above ideal channel condition, if it is assumed that the receiving antenna number is P (P≧M), and the multipath number of the MIMO channel is L, the multipath channel vector from the m-th transmitting antenna to the p-th receiving antenna is:

$$h_{m,p} = (h_{m,p,1}, h_{m,p,2}, \ldots h_{m,p,L})^T \quad (1)$$

The estimation of its channel parameter may be obtained by using a dedicated pilot sequence. If using the code reusing scheme, the signal vector of M substreams spread by the k-th channel code and transmitted through M transmitting antennas is:

$$x_k = (x_{k,1}, x_{k,2}, \ldots x_{k,M})^T \quad (2)$$

FIG. 5 provides a functional block diagram of a MIMO receiver 40 based on V-BLAST detector according to the prior art. As shown in FIG. 5, after performing multipath tracking and despreading on all the (L) multipath components using the k-th channel code through a multipath tracking and despreading unit 41, the signal vector of reception signals of the p-th receiving antenna is:

$$y_{k,p} = (y_{k,p,1}, y_{k,p,2}, \ldots y_{k,p,L})^T \quad (3)$$

Let the L×M multipath channel matrix of the p-th receiving antenna be $H_p = [h_{1,p}, h_{2,p}, \ldots h_{M,p}]$, then $$y_{k,p} = F_k H_p x_k + v_k \quad (4)$$

Wherein $v_k$ is a noise vector, $F_k$ is a L×L code correlation matrix determined by the autocorrelation characteristic, after downlink scrambling, of channels corresponding to the k-th channel code. By using the above equation, the processing of time-space RAKE merging unit 43 as shown in FIG. 5 can be expressed as:

$$z_k = \sum_{p=1}^{P} H_p^H y_{k,p} = R_k x_k + n_k \quad (5)$$

Wherein $z_k = (z_{k,1}, z_{k,2}, \ldots, z_{k,M})^T$ is the time-space RAKE merging output corresponding to signals of M substreams of channels which corresponding to the k-th channel code, $n_k$ is the noise component contained in the output, and $R_k$ is a code channel correlation matrix corresponding to the k-th channel code:

$$R_k = \sum_{p=1}^{P} (H_p^H F_k H_p) \quad (6)$$

In practice, in the received signals containing symbol $x_{k,j}$ transmitted by transmitting antenna j, there may further possibly existed two kinds of path components: One is the path components having the same delay but received by different receiving antennas, another is the multipath components received by the same receiving antenna but having different delays. There is the spacial interference caused by channel code reusing in these path components, and the multipath interference caused by the incomplete orthogonality between the downlink scramble code and its delayed duplication. As will be readily seen, the essence of the time-space RAKE receiving process as shown in equation (5) is the max ratio merging of all of the above spatial domain and time domain path components corresponding to the symbol $x_{k,j}$ transmitted by each transmitting antenna. The processing of V-BLAST detector 44 after time-space RAKE processing is to solve minimum mean square error (MMSE) solution vector of $x_k$ based on equation (5). If neglecting the non-orthogonality between multipaths and approximating $F_k$ as a identity matrix, the V-BLAST is equivalent to a multiuser detector only for canceling spacial interference. Contrarily, it is equivalent to a multiuser detector for canceling the spacial interference and multipath interference at the same time.

More details about the MIMO system based on channel code reusing technique and the receiver based on time-space RAKE receiving and V-BLAST detector can be found in U.S. Pat. No. 6,370,129, "High-speed data services using multiple transmit antennas", "Performance of space-time coding for 3GPP HSDPA service under flat and frequency selective fading conditions", International Conference on 3G Mobile Communications Technologies, 2002 and etc.

However, as detailedly described in the following, in the context of complex cell as mentioned herein, if using MIMO technique, the channel condition is different from the ideal channel condition of the MIMO system of the prior art, wherein since the different geographic positions of transmitting antennas of the transmitting terminal, the spatial distance and propagation path from each of the transmitting terminal's transmitting antenna to the mobile terminal is different, and thus the average path loss from a different transmitting antenna to the mobile terminal's receiving antenna is different. The multipath number and corresponding delay from a different transmitting antenna of the transmitting terminal to any receiving antenna of the mobile terminal are different. Therefore, it is impossible to use existing MIMO technique in the complex cell.

Therefore, it is desired to provide a centralized base station system based on remote radio frequency units and the method thereof, wherein it is able to enforce the MIMO technique matching the channel characteristic of complex cell in the complex cell.

SUMMARY OF THE INVENTION

To solve the above problem, the present invention provides a multiple input/multiple output (MIMO) communication method based on distributed transmission sources in a centralized base station system for transmitting a downlink data stream in a MIMO mode between M transmitting antennas and a mobile terminal within their coverage area, wherein said mobile terminal has P receiving antennas, M>1 and P>1, a first and second channels from at least two transmitting antennas of the M transmitting antennas to one of said P receiving antennas have different multipath distributions, said method comprising: transmitting a different sub-data stream of M sub-data streams obtained by dividing said downlink data stream from said M transmitting antennas respectively to said mobile terminal by using the same spreading code; estimating a multipath channel matrix, corresponding to P receiving antennas of the mobile terminal, of channels from said M transmitting antennas to the receiving antenna, which use the spreading code; and processing transmitted signals corresponding to said M sub-data streams received by the receiving antenna based on said multipath channel matrix of each receiving antenna, to restore said downlink data stream, wherein said step of estimating the multipath channel matrix of each receiving antenna corresponding to the spreading code comprising: measuring the total number of all the multipath received components, each having a different delay, of actually received transmitted signals corresponding to the spreading code; and constructing the multipath channel matrix by taking the number of delays as the multipath number of the MIMO system, so that if the signal transmitted by one of the transmitting antennas to the receiving antenna has no multipath component corresponding to one of the delays, the channel parameter corresponding to the transmitting antenna, the receiving antenna and the delay is set as 0, and said transmitting step comprising: adjusting the gain of said M sub-data streams based on the average signal quality measurement of uplink signals from the mobile terminal to said M transmitting antennas, so that average path losses of respective downlink channels are substantially equal.

According to the present invention, in a centralized base station system based on remote radio frequency units, in a complex cell formed by merging a plurality of neighbour cells, it is possible to constitute a distributed transmitting antenna system by using remote radio frequency units in the complex cell, thereby greatly increasing downlink rate by using MIMO technique. As compared to the existing centralized base station technique, this technique has the following advantages:

Since the complex cell is formed by merging a plurality of micro cells, it certainly has a plurality of antenna, and therefore it is possible to implement the flexible configuration of single antenna systems and multiple antenna systems by using the existing antenna systems, thereby supporting advanced MIMO functions without replacing or upgrading a base station's antenna and radio frequency subsystem;

By using the MIMO technique based on channel code reusing, it is possible to counteract the negative factor of a relatively reduced downlink capacity due to the enlarged cell when using the complex cell technique, thereby alleviating or counteracting negative factors such as reduced downlink capacity while obtaining the benefits of improving handoff performance, flexible allocation of resources and etc. due to the use of the complex cell technique;

It is possible to provide a high speed downlink packet access for the mobile terminal supporting MIMO function by using the technique.

DESCRIPTION OF THE DRAWINGS

The above and/or other aspects, features and/or advantages of the present invention will be further appreciated in view of the following description in conjunction with the accompanying figures, wherein.

DETAILED DESCRIPTION OF THE PREFERRED EMBODIMENTS

As stated above, when using MIMO technique in a complex cell, its channels have respective features.

Figure 1:
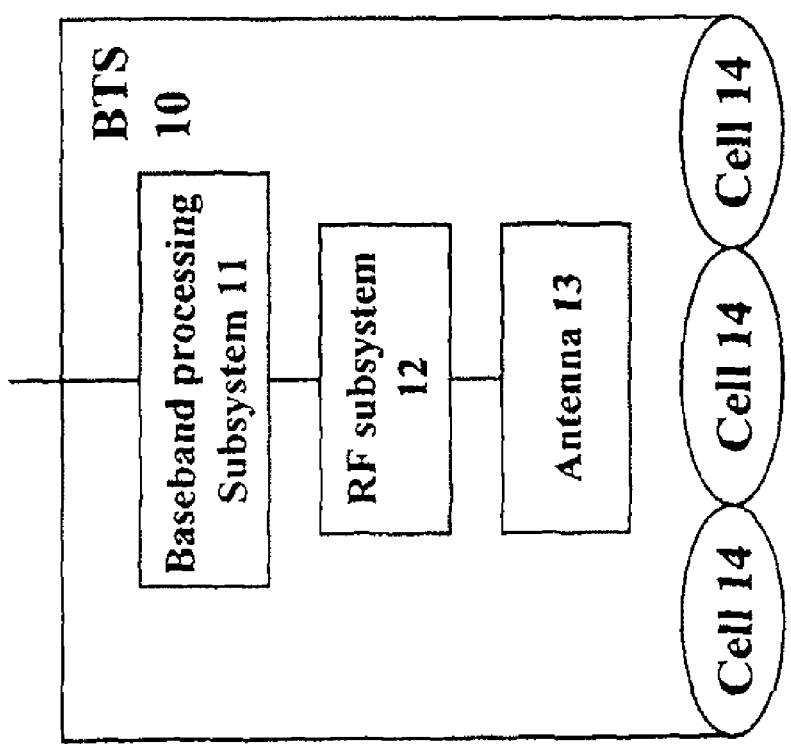
FIG. 1 is a schematic diagram showing the structure of a base station system having a plurality of cells.
Figure 2:
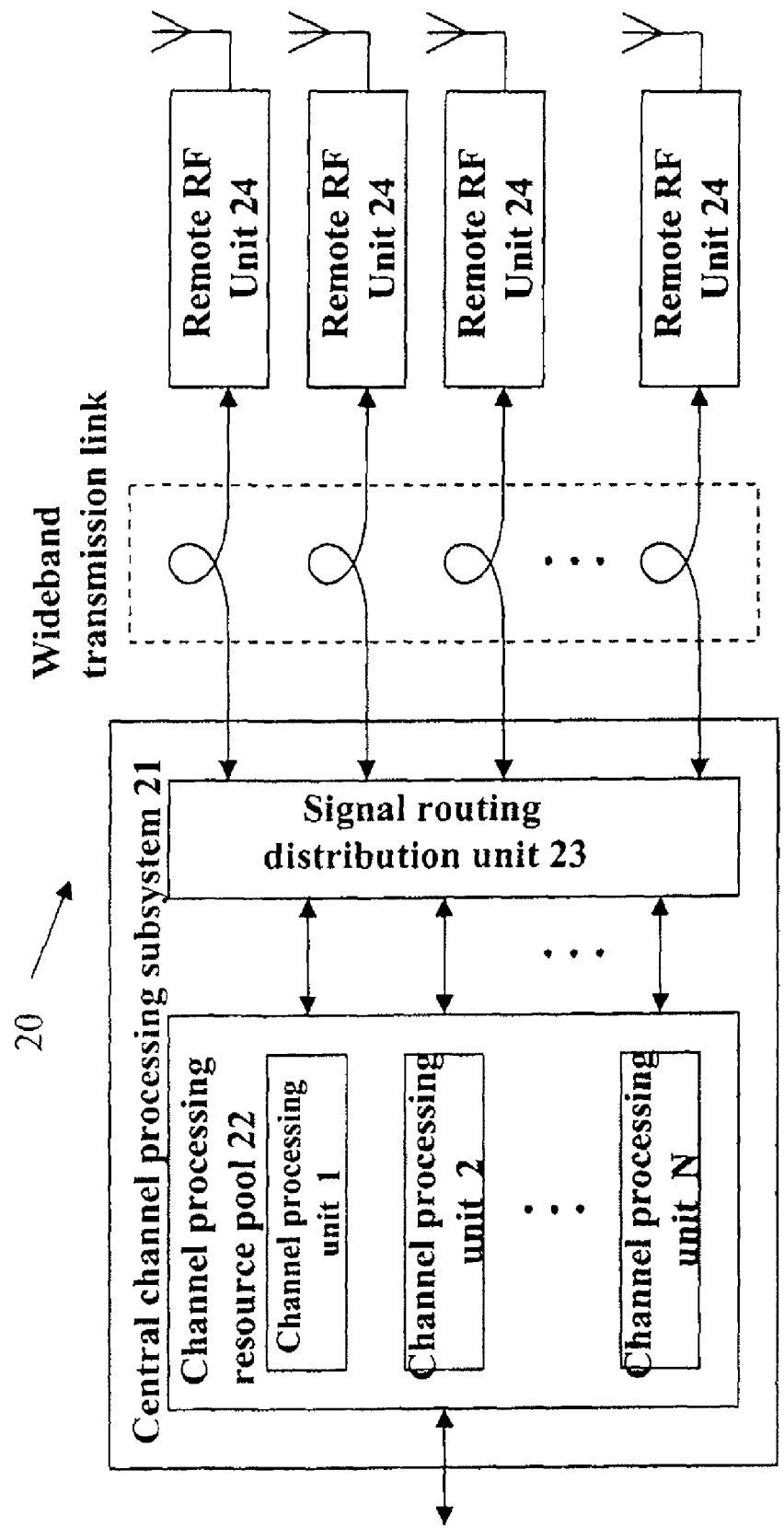
FIG. 2 is a block diagram showing the structure of a centralized base station system based on remote radio frequency units.
Figure 3:
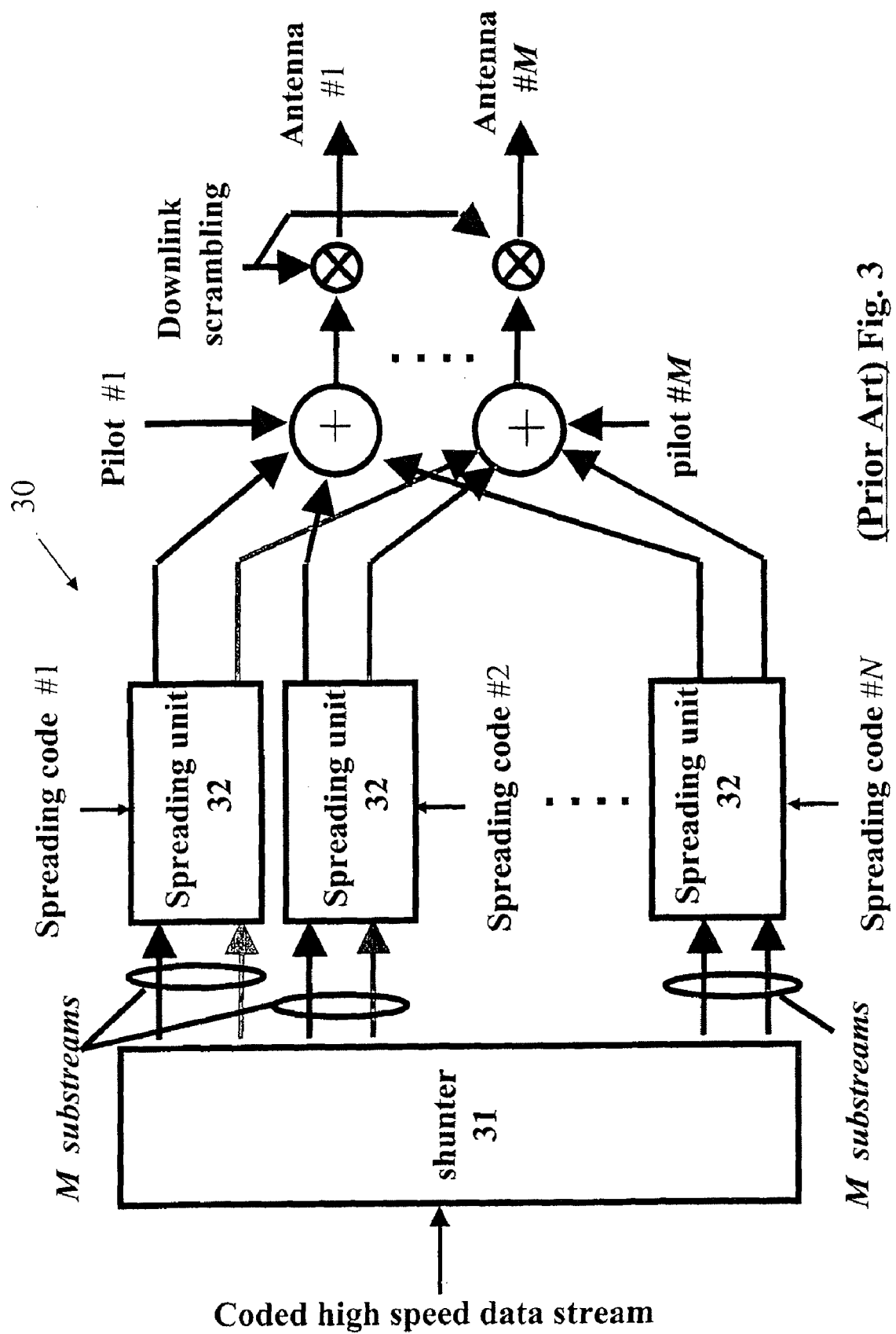
FIG. 3 is a data flow diagram of a transmitting terminal of a MIMO system based on channel code reusing scheme.
Figure 4:
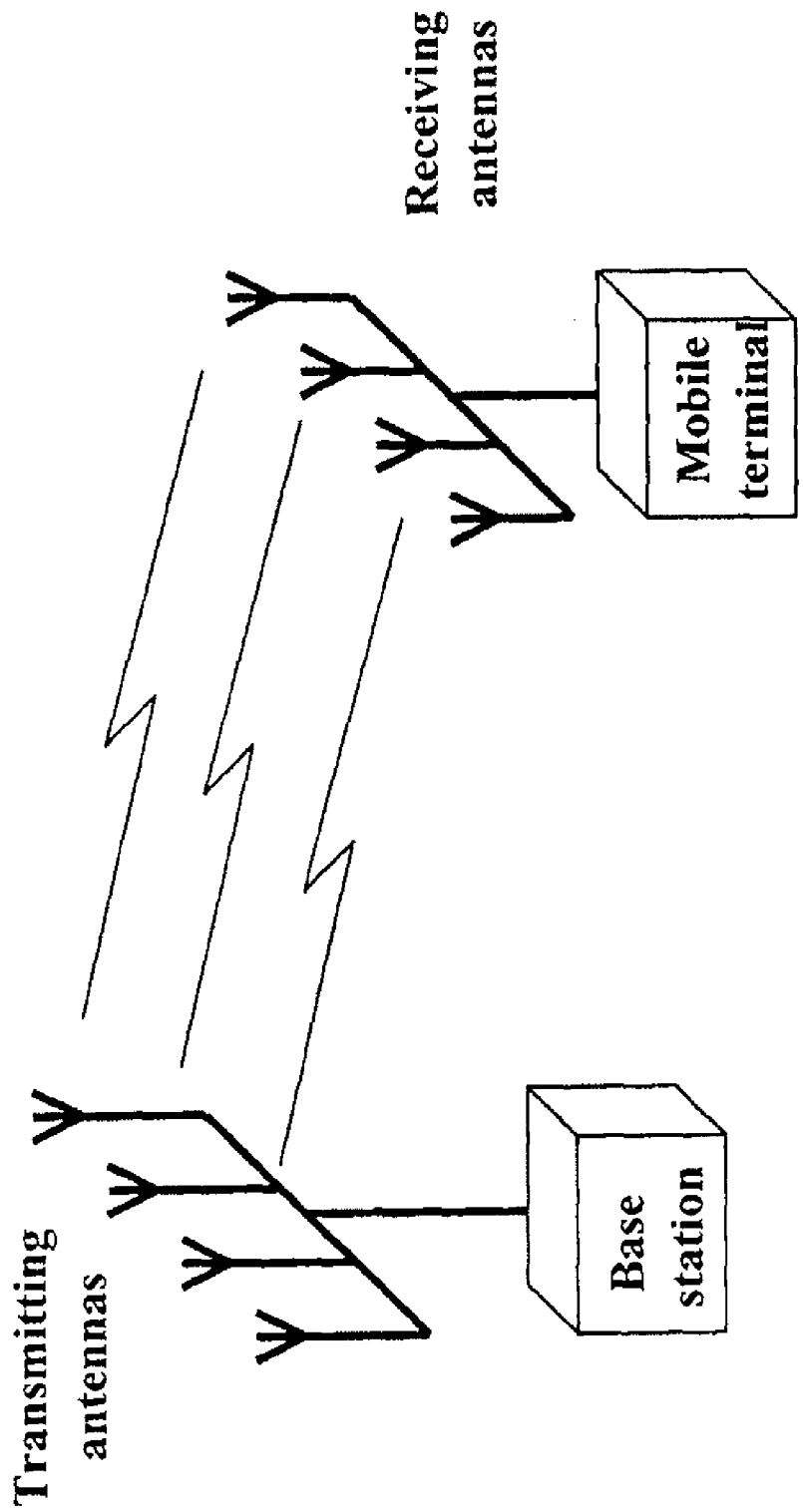
FIG. 4 schematically illustrates a antenna configuration of the MIMO system according to the prior art.
Figure 5:
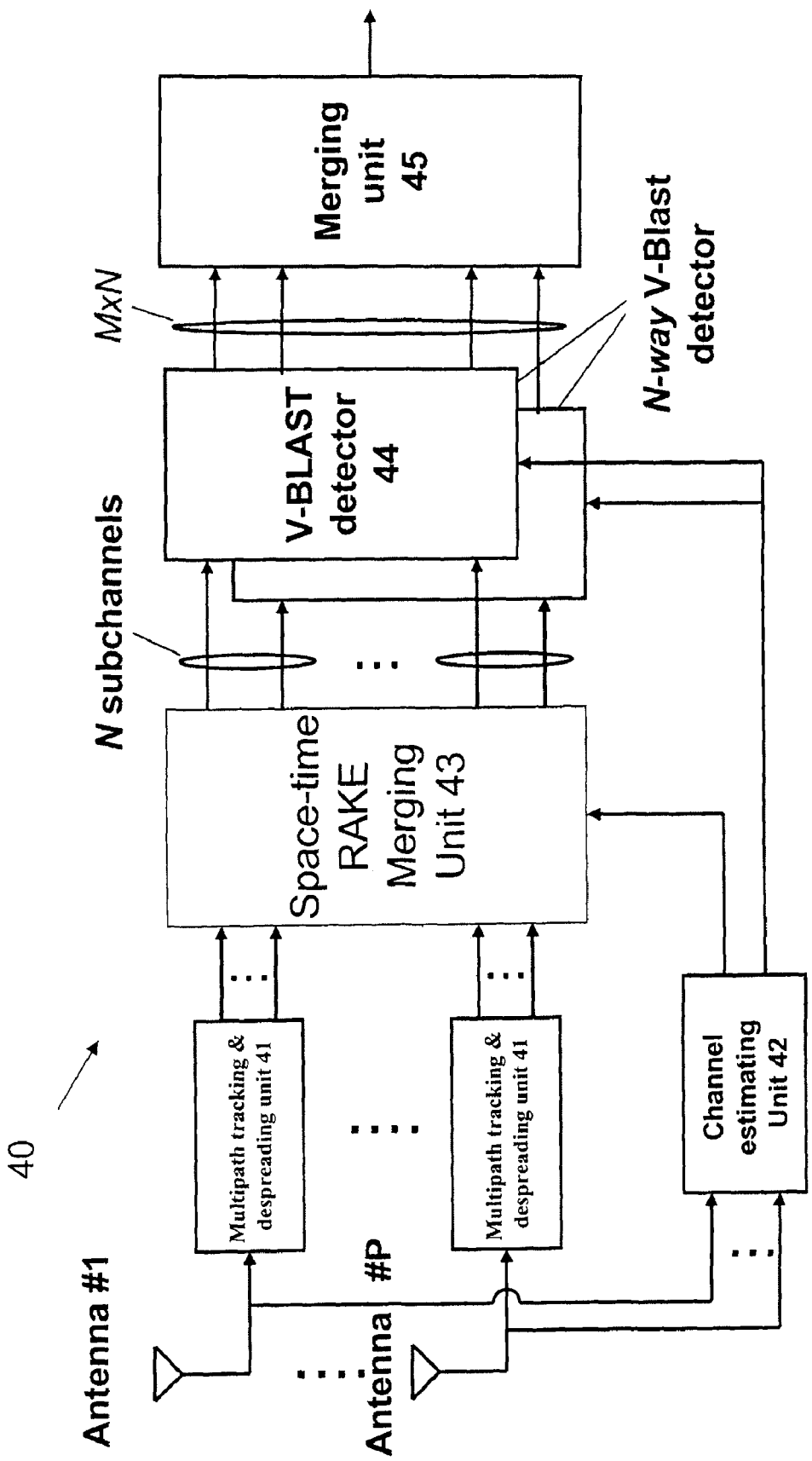
FIG. 5 is a schematic block diagram of a MIMO receiver based on V-BLAST detector.
Figure 6:
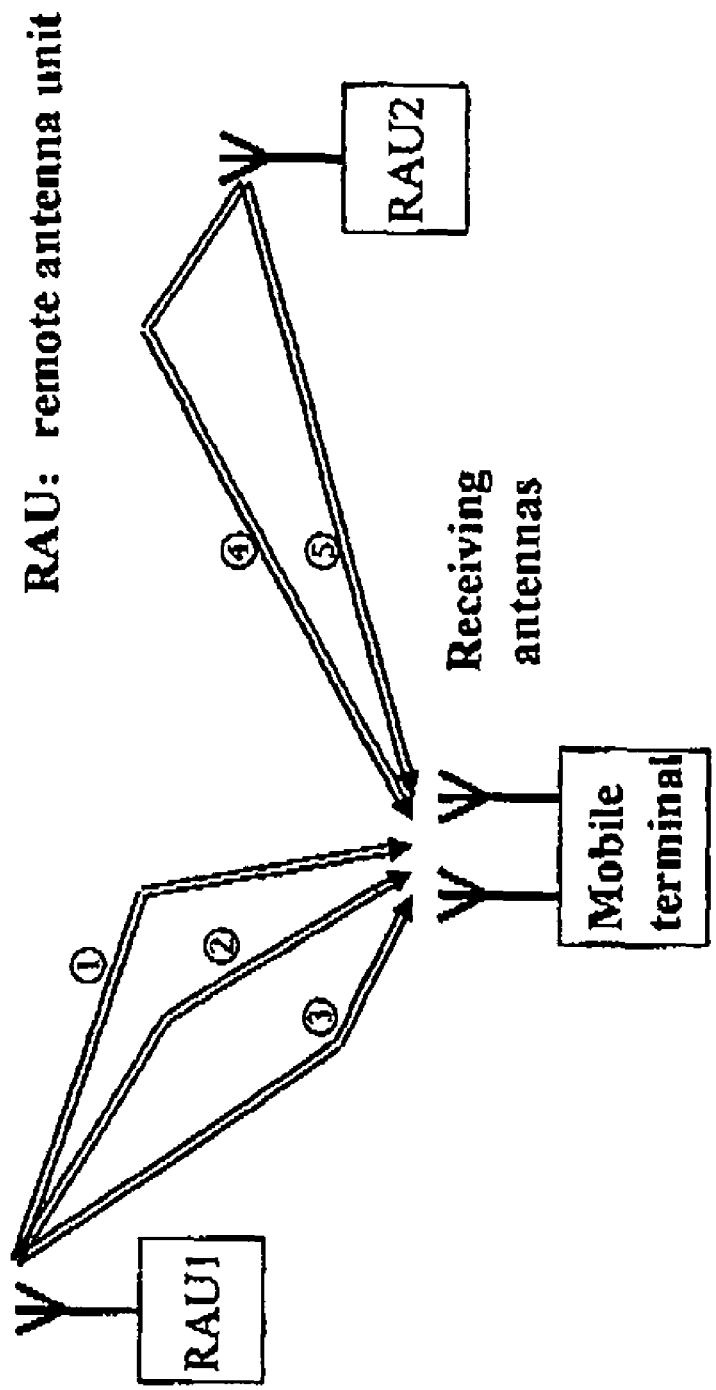
FIG. 6 is a schematic diagram of MIMO channels based on distributed transmitting antenna system.
Figure 7:
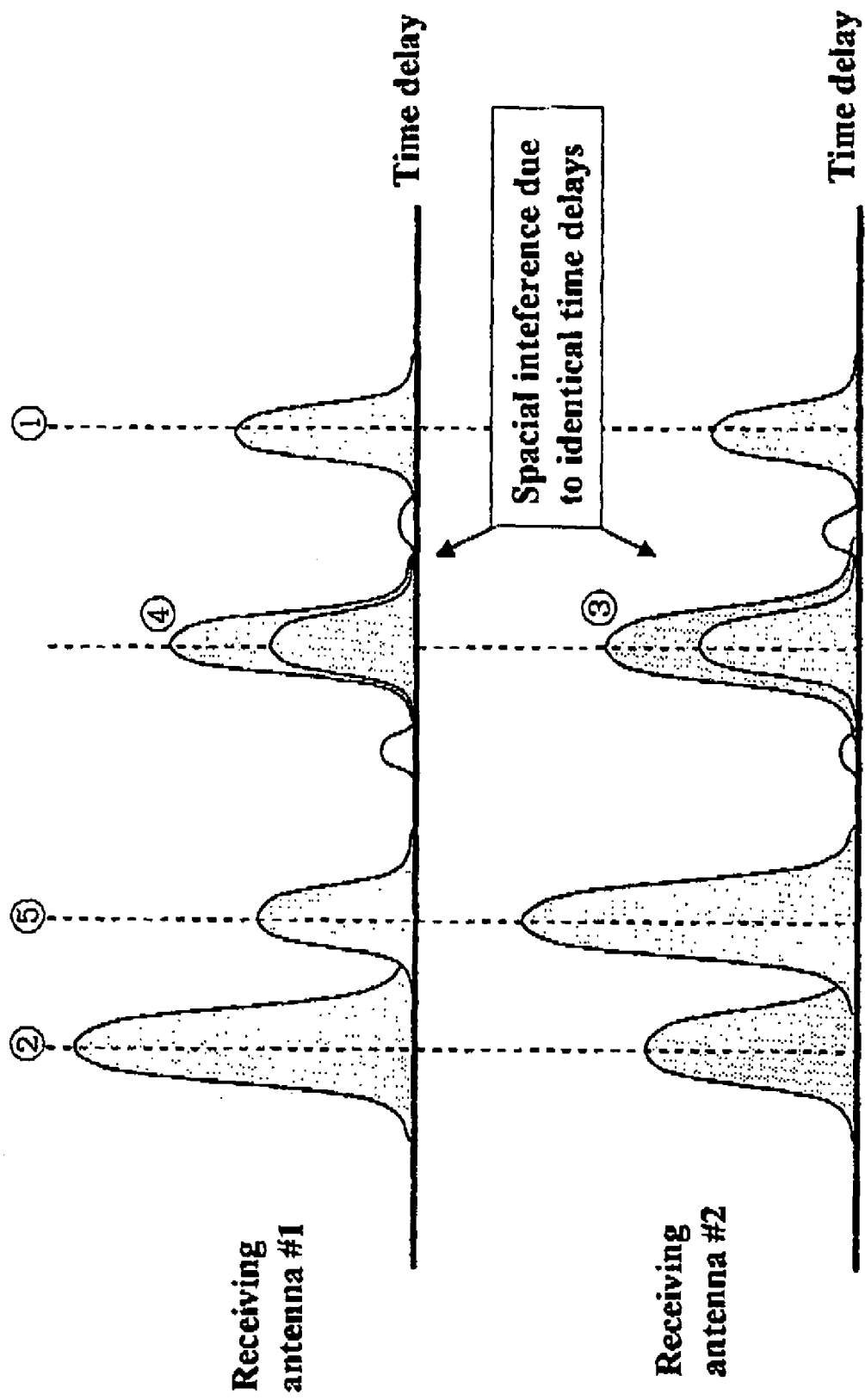
FIG. 7 is a schematic diagram of time-space path components.

1. Channel Characteristic of MIMO System Based on Distributed Transmitting Antennas FIG. 6 schematically illustrate a 2×2 MIMO system using distributed transmitting antennas according to the present invention. As shown in the figure, there are 3 multipaths labeled as #1, #2, #3 from remote antenna unit RAU1 to the mobile terminal, and there are 2 multipaths labeled as #4, #5 from remote antenna unit to the mobile terminal. In similar to a conventional MIMO system, in any multipath between the RAU1 and the mobile terminal, the channels from the RAU1 to two receiving antennas have the same multipath delay. In any multipath between the RAU2 and the mobile terminal, the channels from the RAU2 to two receiving antennas have the same multipath delay. The channel fading of multipaths from the RAU1 and the RAU2 to two antennas of the mobile terminal is mutually independent. FIG. 7 shows a snapshot of time-space path components in the MIMO system. It can be seen that the multipath delays of signals received by two receiving antennas of the mobile terminal are the same, but the random fluctuation of their signal intensity (the random variation of phase is not shown in the figure) is irrelevant, wherein multipath #1, #2 of RAU1 and multipath #5 of RAU2 have no spacial interference since their delays are different, but multipath #3 of RAU1 and multipath #4 of RAU2 are overlapped because of the same delays.

As compared to the MIMO wireless propagation channel according to the prior art, in a complex cell, a MIMO channel in the downlink direction based on the configuration of distributed transmitting antenna units of a centralized base station system has the following difference:

Since the difference between geographical locations, the spatial distance and propagation path from an antenna of each remote radio frequency unit to a mobile terminal is different, and therefore the average path loss from a different transmitting antenna to the mobile terminal's receiving antennas is different. That is to say, the ideal channel condition (1) is not satisfied.

The multipath numbers and corresponding delays from a transmitting antenna to different receiving antennas of the mobile terminal are identical, but the multipath numbers and corresponding delays from different transmitting antennas to a receiving antenna of the mobile terminal are different. That is to say, the ideal channel condition (2) is not satisfied;

However, the following characteristics are the same as MIMO wireless channel of the prior art:

The multipath channel fading of propagation paths from any transmitting antenna to any receiving antenna is mutually independent. That is to say, the ideal channel condition (3) is satisfied.

The interferences and the noise power spectra received by different receiving antennas are identical and independent from each other. That is to say, the ideal channel condition (4) is satisfied.

Actually, because of distributed structure of transmitting antennas in the present invention, as compared to the usual MIMO technique, it is possible to obtain an ideal statistical independence of multipath channel fading.

It can be recognized from the above comparison that, in the received signals of the MIMO system using distributed transmitting antennas according to the present invention, there still are said two kinds of space, time interferences, but as compared to the prior art's MIMO system, the time-space interference in the MIMO system of a complex cell has the following features:

(1) Since a part of transmitted signals can be resolved because of different delays, the spacial interference caused by channel code reusing is lower;

(2) Accordingly, because of the increasing in time domain of multipath components, the multipath interference also increases.

The aforementioned channel processing model of the prior art based on ideal channel condition is apparently inadaptable to the complex cell's channel characteristic.

In a word, as compared to the conventional MIMO system, the MIMO system of the present invention needs to consider the complex cell's channel characteristic, i.e., the problem caused by not satisfying the features of ideal channel conditions (1) and (2).

As described below, by reflecting the difference of multipath component actually received on receiving antennas of the mobile terminal in the construction of channel matrix, the present invention makes the composition of reception signal vector of the receiving antennas still has the form identical to that of a conventional MIMO system, thereby the available receiver technique (such as time-space RAKE and V-BLAST detector and etc.) in the conventional MIMO system is applicable to implement the processing of received signals, thereby solving the problem faced when applying the MIMO technique in said complex cell, that is, the problem that ideal channel condition (1) required in the conventional MIMO system is not satisfied because of different multipath numbers and multipath delays from different transmitting antennas to the mobile terminal's receiving antenna.

Furthermore, according to the present invention, by compensating in the MIMO system's transmitting terminal the difference of average path losses between branches of different transmitting antennas, the average path losses of the multipaths are substantially identical, thus overcome the insufficiency that the existing MIMO system is incapable of actively accommodating the condition where the average path losses of the multipaths may be not equal, thereby adjusting the channel condition to satisfy the ideal channel condition (2) of the MIMO system.

2. Downlink MIMO Transmission Control Technique Based on Distributed Transmitting Antennas According to the present invention, when using complex cell technique in a centralized base station system based on remote radio frequency units, the downlink MIMO function may be implemented based on distributed transmitting antennas. To this end, according to the measurement of uplink average path loss, the centralized base station adaptively adjust relative magnitude of downlink transmission signals from the mobile terminal transmitted by remote radio frequency unit antennas as MIMO transmission sources, thereby compensating the difference of average path losses from the remote radio frequency unit antennas as MIMO transmission sources to the mobile terminal's receiving antenna. Furthermore, according to one preferable embodiment, for the convenience of compensation, the remote radio frequency units with smaller downlink average path losses are selected as MIMO transmission sources, and other remote radio frequency units with larger downlink average path losses in the complex cell do not transmit any downlink signal of the mobile terminal.

Uplink and downlink path losses of a time division duplexing (TDD) system can be considered as equal, and fast fading of uplink and downlink channels in a frequency division duplexing (FDD) system is irrelevant because of different uplink and downlink frequency bands. Therefore, the instant downlink path loss and the instant uplink path loss are different. However, since the uplink and downlink path losses averaged over a period of time are mainly dependent on the spatial distance of the propagation path, they are approximately equal. Therefore, the measurement of uplink average path loss may be considered as an estimated value of downlink average path loss. Therefore, according to the present invention, relative magnitudes of downlink average path losses from remote radio frequency unit to the UE are determined according to signal qualities received by the remote radio frequency units of the complex cell in the uplink direction from the mobile terminal (for example, signal intensity or code channel power or signal-interference ratio (SIR), wherein the signal intensity is a total signal level for the branch including the interference and noise components, the code channel power is a useful signal power for the branch with the interference and noise components being removed, SIR is a ratio of code channel power and the power of the interference and noise components), for use with the downlink MIMO transmission control.

Figure 8:
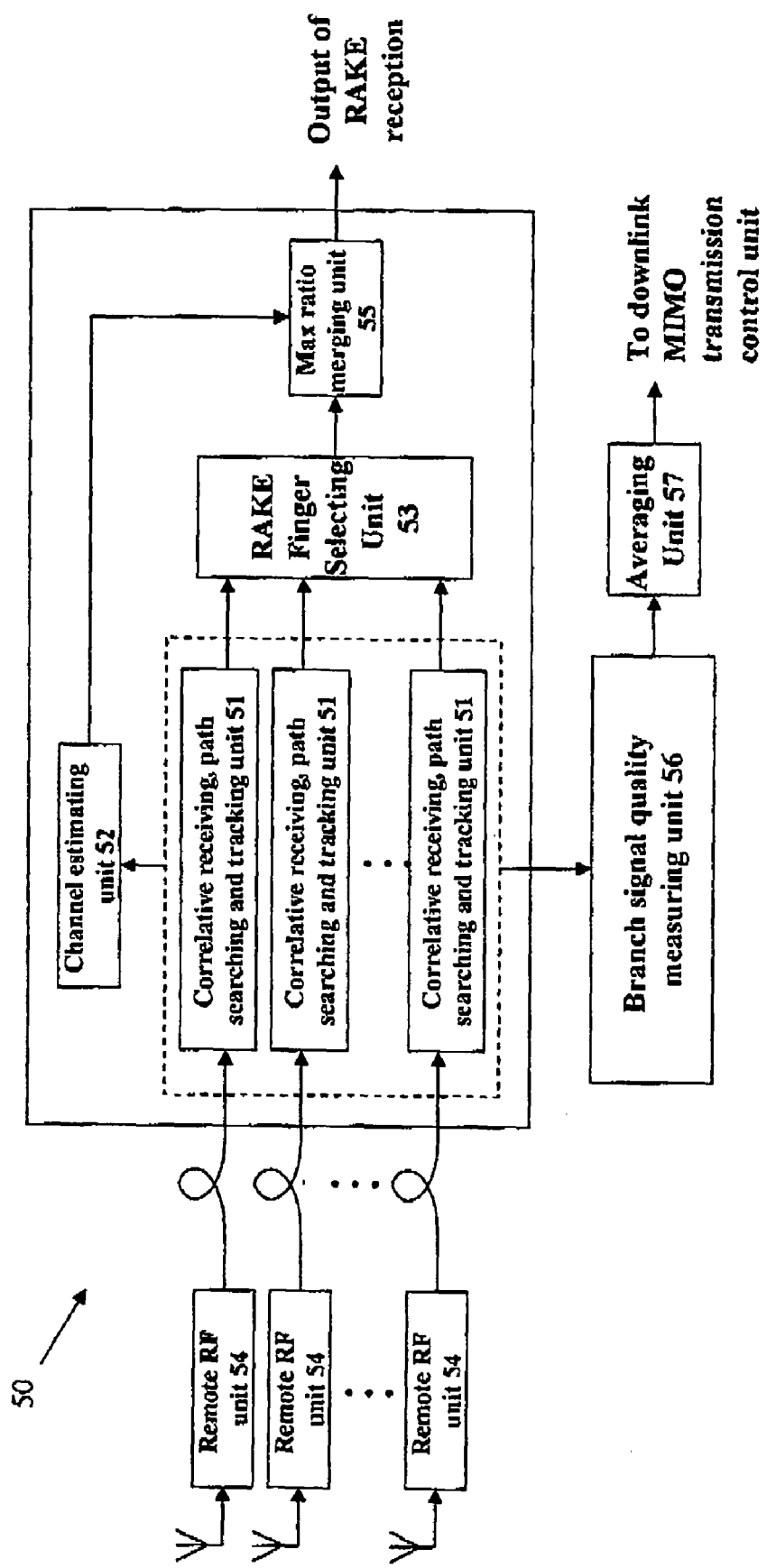
FIG. 8 is a block diagram showing a section in the transmitting terminal of the MIMO system, involving the detection of average path loss according to an embodiment of the present invention.

FIG. 8 is a block diagram showing a section in the transmitting terminal of the MIMO system, involving the detection of average path loss according to an embodiment of the present invention. For convenience of explanation, FIG. 8 only presents the spreading reception device 50 corresponding to one mobile terminal in the receiver of a centralized base station. As shown in the figure, the uplink reception signal from each remote radio frequency unit 54 of the complex cell is delivered to the centralized base station via a wideband transmission link for baseband processing. For the uplink, the spreading reception device of the complex cell is a receiving diversity RAKE receiver, i.e., it is needed to perform correlation reception, multipath searching and tracking processing respectively on the signals of all the receiving branches by correlative receiving, multipath searching and tracking unit 51. At the same time, the channel estimation processing is performed on each receiving branch by the channel estimating unit 52, and finally the paths having strengths greater than a certain threshold are selected from all the receiving branches by the RAKE finger selecting unit 53 for max ratio merging in the max ratio merging unit 55. According to the present invention, based on the existing technique, the signal qualities (signal intensity/code channel power/SIR) of remote radio frequency unit branches are obtained by branch signal quality measuring unit 56 from uplink diversity RAKE receiving units, and are output to the downlink MIMO transmission control unit after the cumulative averaging by averaging unit 57.

For the convenience of explanation, a MIMO system based on channel code reusing scheme will be taken as an example, but the spirit and concept of the present invention is also applicable to MIMO systems in other forms.

Figure 9:
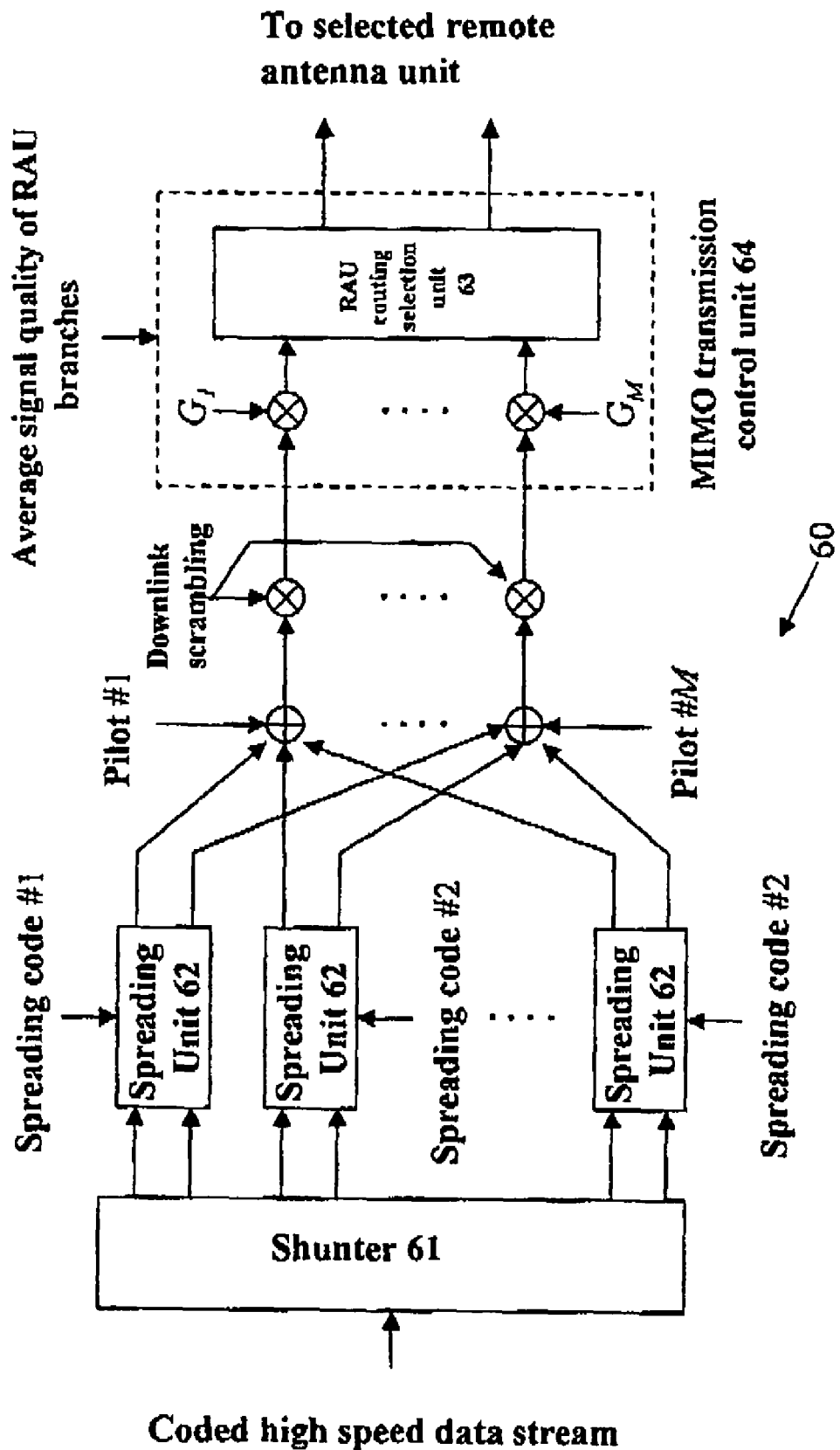
FIG. 9 is a block diagram showing a section in the transmitting terminal of the MIMO system, involving the compensation of average path loss according to the embodiment of the present invention.

FIG. 9 is a schematic diagram showing a transmitting terminal structure 60 of the MIMO system using distributed transmitting antennas according to the present invention. As compared to the usual MIMO system such as a MIMO system based on channel code reusing scheme, a MIMO transmission control unit 64 is added. The unit determines respective transmission branch gains $G_i$ (i=1, 2, ..., M) by using the average signal qualities (average signal strength/code channel power/SIR) of respective remote radio frequency unit branches obtained by the uplink diversity RAKE receiving units, as shown in FIG. 8. After the transmission branches' powers are adjusted with the gains $G_i$, corresponding remote radio frequency units are notified to perform transmission.

As known by one skilled in the art, there can be a variety of methods to reach said compensation object. As a nonrestrictive embodiment, the transmission branch gains can be determined by the following equation:

$$G_i = \frac{1/S_i}{\sum_{m=1}^{M}(1/S_m)} \quad (7)$$

Where $S_i$ (i=1, 2, ..., M) is the average signal strength/code channel power/SIR of a corresponding remote radio frequency unit branch. In a preferable embodiment, MIMO transmission control unit 64 selects M remote radio frequency units with higher average signal qualities (for example, greater than a defined threshold) as MIMO transmission sources.

As known by one skilled in the art, beside the above example, there can be many other alternatives to reach said compensation object. For example, these include calculating an average value and approaching the average value, and so on.

3. Downlink MIMO Receiving Technique Based on Distributed Transmitting Antennas

According to the improve by the present invention to the downlink MIMO transmission technique, and ideal channel conditions (1)-(4) of the prior art MIMO system, the channels of the present invention's MIMO system satisfy condition (2)-(4).

Since the assumption of a conventional MIMO system about ideal channel condition (1) do not hold true in the MIMO system of the present invention, the multipath numbers and multipath delays from different transmitting antennas to the same receiving antenna may be not equal.

To this end, according to the present invention, since the channel matrices are constructed according to all the multipath components actually received on the receiving antennas of a mobile terminal in the receiving process of a MIMO system using distributed transmitting antennas as proposed by the present invention, it is possible to solve the problem faced when applying the MIMO technique in said complex cell, that is, the problem that ideal channel condition (1) required in the conventional MIMO system is not satisfied because of different average path losses from different transmitting antennas to the mobile terminal's receiving antenna.

Therefore, according to the present invention, the present invention proposes that the reception in the MIMO system using distributed transmitting antennas still uses the receiver structure in the conventional MIMO system which is based on the time-space RAKE reception and the V-BLAST detector, and at the same time, the present invention proposes that the multipath channel matrix in the receiver of the MIMO system using distributed transmitting antennas still has the same form with the conventional MIMO technique, i.e.:

$$H_p = [h_{1,p}, h_{2,p}, \cdots h_{M,p}] = \begin{bmatrix} h_{1,p,1} & h_{2,p,1} & \cdots & h_{M,p,1} \\ h_{1,p,2} & h_{2,p,2} & \cdots & h_{M,p,2} \\ \vdots & \vdots & \vdots & \vdots \\ h_{1,p,L} & h_{2,p,L} & \cdots & h_{M,p,L} \end{bmatrix} \quad (8)$$

Wherein M is the number of remote radio frequency units as MIMO transmission sources in the MIMO system using distributed transmitting antennas according to the present invention as shown in FIG. 9, P is the number of receiving antennas of the mobile terminal (P≧M), L is multipath number of channels in the MIMO system using distributed transmitting antennas. However, according to the present invention, different from the conventional MIMO system where each receiving antenna reception signal has the equal multipath number, L is defined as the total number of multipath components having different multipath delays in all the transmitting antenna signals received by the receiving terminal.

By taking FIG. 7 as an example, RAU1 corresponds to 3 multipaths #1, #2, #3, RAU2 corresponds to 2 multipaths #4, #5, signals from RAU1 and RAU2 have total 4 multipaths with different delays on the receiving end of the mobile terminal (wherein multipath #3 of RAU1 and multipath of RAU2 overlap due to the same delay), and therefore, according to the present invention, L=4, the multipath channel matrices to which their two receiving antennas correspond may be expressed as:

$$H_1 = \begin{bmatrix} h_{1,1,1} & h_{2,1,1} \\ h_{1,1,2} & h_{2,1,2} \\ h_{1,1,3} & h_{2,1,3} \\ h_{1,1,4} & h_{2,1,4} \end{bmatrix}, H_2 = \begin{bmatrix} h_{1,2,1} & h_{2,2,1} \\ h_{1,2,2} & h_{2,2,2} \\ h_{1,2,3} & h_{2,2,3} \\ h_{1,2,4} & h_{2,2,4} \end{bmatrix} \quad (9)$$

Thus, according to the above definition of multipath number L, some elements in the multipath channel matrix of the present invention as shown in equation (8) will be zero, i.e., if some elements $h_{m,p,l}=0$ (wherein m=1, 2, ... M, l=1, 2, ... L), it indicates that the multipath signal having the l-th multipath delay in all the L multipath components on the receiving terminal contains no signal from the m-th transmitting antenna to the p-th receiving antenna, that is to say, the multipath component is caused by the signal of a certain or some other transmitting antennas.

In a conventional MIMO system, the multipath number from each transmitting antenna to the mobile terminal's receiving antenna is equal, but in the MIMO system based on distributed transmitting antennas of the present invention, the number L of the multipath channels described by the multipath channel matrix is greater than or equal to the multipath number from each transmitting antenna to the mobile terminal's receiving antenna. When L is greater than the multipath number from a transmitting antenna to the mobile terminal's receiving antenna, the multipath signal with some multipath delays in the channel vector from the transmitting antenna to anyone receiving antenna certainty contains no signal from the transmitting antenna to corresponding receiving antenna.

Still taking FIG. 7 as an example, since L=4, with respect to two receiving antennas of the mobile terminal, the number of dimension of the multipath channel matrix is 4×2 dimensions, and according to the feature of the above zero elements, the multipath channel matrix may be further expressed as:

$$H_1 = \begin{bmatrix} h_{1,1,1} & 0 \\ 0 & h_{2,1,2} \\ h_{1,1,3} & h_{2,1,3} \\ h_{1,1,4} & 0 \end{bmatrix}, H_2 = \begin{bmatrix} h_{1,2,1} & 0 \\ 0 & h_{2,2,2} \\ h_{1,2,3} & h_{2,2,3} \\ h_{1,2,4} & 0 \end{bmatrix} \quad (10)$$

Although the present invention has been described according to preferable embodiments, but these descriptions are only for purpose of explaining the present invention, and should not be construed as any limitation on the present invention. For example, although the MIMO technique for maximizing the transmission rate is illustrated in the embodiment, the MIMO technique based on diversity gain maximization can also be used. As can be known by one skilled in the art according to the concept of the present invention, repeating data transmitted to the same terminal use different spreading codes respectively. One skilled in the art can perform various possible modifications and improvements on the present invention, and these modifications and improvements are intended to be included in the scope and spirit of the present invention as defined by the appended claims.

The invention claimed is:

1. A multiple input/multiple output (MIMO) communication method based on distributed transmission sources in a centralized base station system for transmitting a downlink data stream in a MIMO mode between M transmitting antennas and a mobile terminal within their coverage area, wherein said mobile terminal has P receiving antennas, M>1 and P>1, a first and second channels from at least two transmitting antennas of the M transmitting antennas to one of said P receiving antennas have different multipath distributions, said method comprising:

transmitting a different sub-data stream of M sub-data streams obtained by dividing said downlink data stream from said M transmitting antennas respectively to said mobile terminal by using a same spreading code;

estimating a multipath channel matrix, corresponding to said P receiving antennas of the mobile terminal, of channels from said M transmitting antennas to the receiving antenna, which use the same spreading code; and processing transmitted signals corresponding to said M sub-data streams received by the receiving antenna based on said multipath channel matrix of each receiving antenna, to restore said downlink data stream, wherein said step of estimating the multipath channel matrix of each receiving antenna corresponding to the same spreading code comprising:

measuring the total number of all the multipath received components, each having a different delay, of actually received transmitted signals corresponding to the same spreading code; and constructing the multipath channel matrix by taking the number of delays as the multipath number of the MIMO system, so that if the signal transmitted by one of the transmitting antennas to the receiving antenna has no multipath component corresponding to one of the delays, a channel parameter corresponding to the transmitting antenna, the receiving antenna and the delay is set as 0, and said transmitting step comprising:

adjusting a gain of said M sub-data streams based on an average signal quality measurement of uplink signals from the mobile terminal to said M transmitting antennas, so that average path losses of respective downlink channels are equal.

2. The communication method of claim 1, wherein said multipath distribution comprises a multipath number.

3. The communication method of claim 1, wherein said multipath distribution comprises a multipath delay.

4. The communication method of claim 1, wherein said M transmitting antennas belong to a complex cell formed by grouping a plurality of cells.

5. The communication method of claim 1, wherein said constructing step comprises:

determining whether the received components having each said delay include a received component corresponding to the sub-data stream transmitted by each of said M transmitting antennas through measuring a pilot sequence corresponding to each of said M transmitting antennas.

6. The communication method of claim 1, wherein said adjusting step comprises determining each sub-data stream's gain $G_i$, i=1, 2, ..., M through the following manner:

$$G_i = \frac{1/S_i}{\sum_{m=1}^{M} (1/S_m)},$$

wherein $S_i$, i=1, 2, ..., M are said average signal qualities corresponding to said M transmitting antennas.

7. The communication method of claim 1, wherein said transmitting step further comprises:
   selecting the antennas from the plurality of transmitting antennas which have lower average path losses towards said mobile terminal to be said M transmitting antennas.

8. The communication method of claim 1, wherein said adjusting step comprises measuring the average signal quality over a time period where the average path losses of uplink and downlink channels are equal.

9. The communication method of claim 1, wherein said signal quality is one of signal intensity, code channel power and signal-interference ratio.

10. The communication method of claim 1, wherein said transmitting step comprises transmitting one different sub-data stream of said M sub-data streams to said mobile terminal respectively through said M transmitting antennas by using another spreading code, said estimating step comprises estimating a multipath channel matrix of each receiving antenna corresponding to said another spreading code, and said processing step comprises processing the receiving antenna's received signal according to the multipath channel matrix corresponding to said another spreading code, to restore said M sub-data streams, and obtain the final downlink data stream according to said restored M sub-data streams for said different spreading code.

* * * * *